March 19, 1946.  H. L. BLUM  2,396,815
BY-PASS VALVE MECHANISM
Filed Nov. 5, 1942  2 Sheets-Sheet 1

HOSMER L. BLUM
INVENTOR.
BY Edmund W. E. Kamm

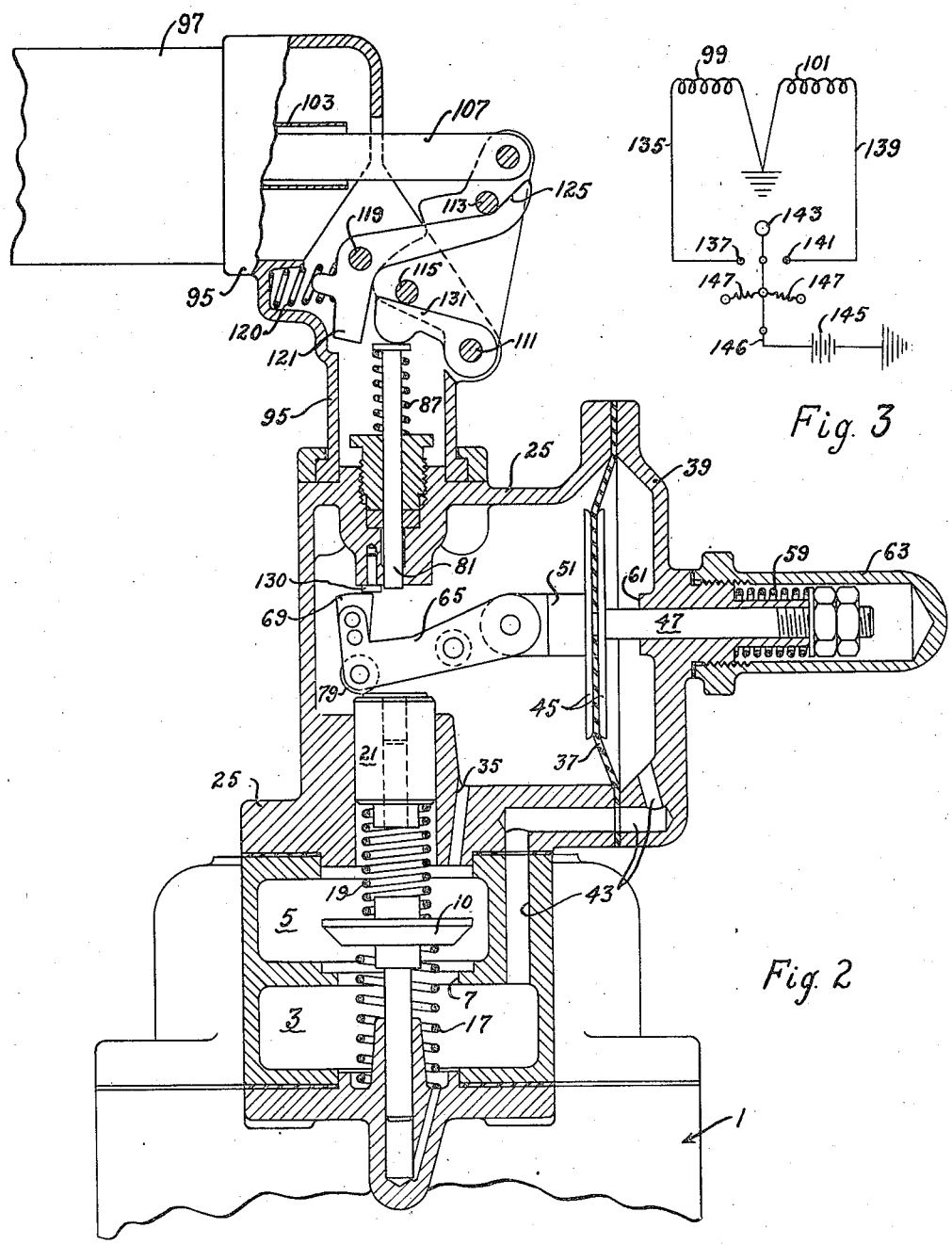

Patented Mar. 19, 1946

2,396,815

UNITED STATES PATENT OFFICE 2,396,815

BY-PASS VALVE MECHANISM

Hosmer L. Blum, Fort Wayne, Ind., assignor to S. F. Bowser & Company, Incorporated, Fort Wayne, Ind., a corporation of Indiana Application November 5, 1942, Serial No. 464,683

11 Claims. (Cl. 137—139)

This invention relates to the mechanism by which a by-pass port in a fluid meter is opened and closed. More specifically, it relates to a mechanism which is adapted to open or close a by-pass port in a meter which is used to measure the gasoline flowing to an aircraft engine in response to a manually operated switch or to open the port automatically when the resistance of the meter to the flow of fuel increases toward the point at which it may impair the operation of the engine. The automatic control governs the manual operation to the extent that the valve cannot be closed by the manual control when the automatic control occupies its valve open position.

It is another object of the invention to provide a by-pass valve mechanism which is actuated to open and closed position by a power device.

It is still another object of the invention to provide a by-pass valve mechanism which will be actuatable to open or closed positions by single impulses from a power mechanism.

Yet another object of the invention is to combine a manual valve control with an automatic control.

Still another object of the invention is to combine the two controls so that the valve cannot be closed while the automatic control is in the valve open position.

Another object of the invention is to combine the two controls so that the valve cannot be held closed by the automatic control when the manual control is in the valve open position.

It is another object of the invention to mount the solenoid and associated mechanism of the manual control so that it may be rotated to any suitable position for mounting.

It is yet another object of the invention to provide a solenoid operated lever mechanism which will be locked in the valve closed position so as to maintain this position after the solenoid is de-energized.

These and other objects will become apparent from a study of this specification and the drawings which are attached hereto and made a part hereof and in which:

Figure 2 is a view similar to Figure 1 but showing both the manual and the automatic controls in the valve open position.

Figure 3 is a wiring diagram showing the two solenoid coils and the control switch.

Figure 1:
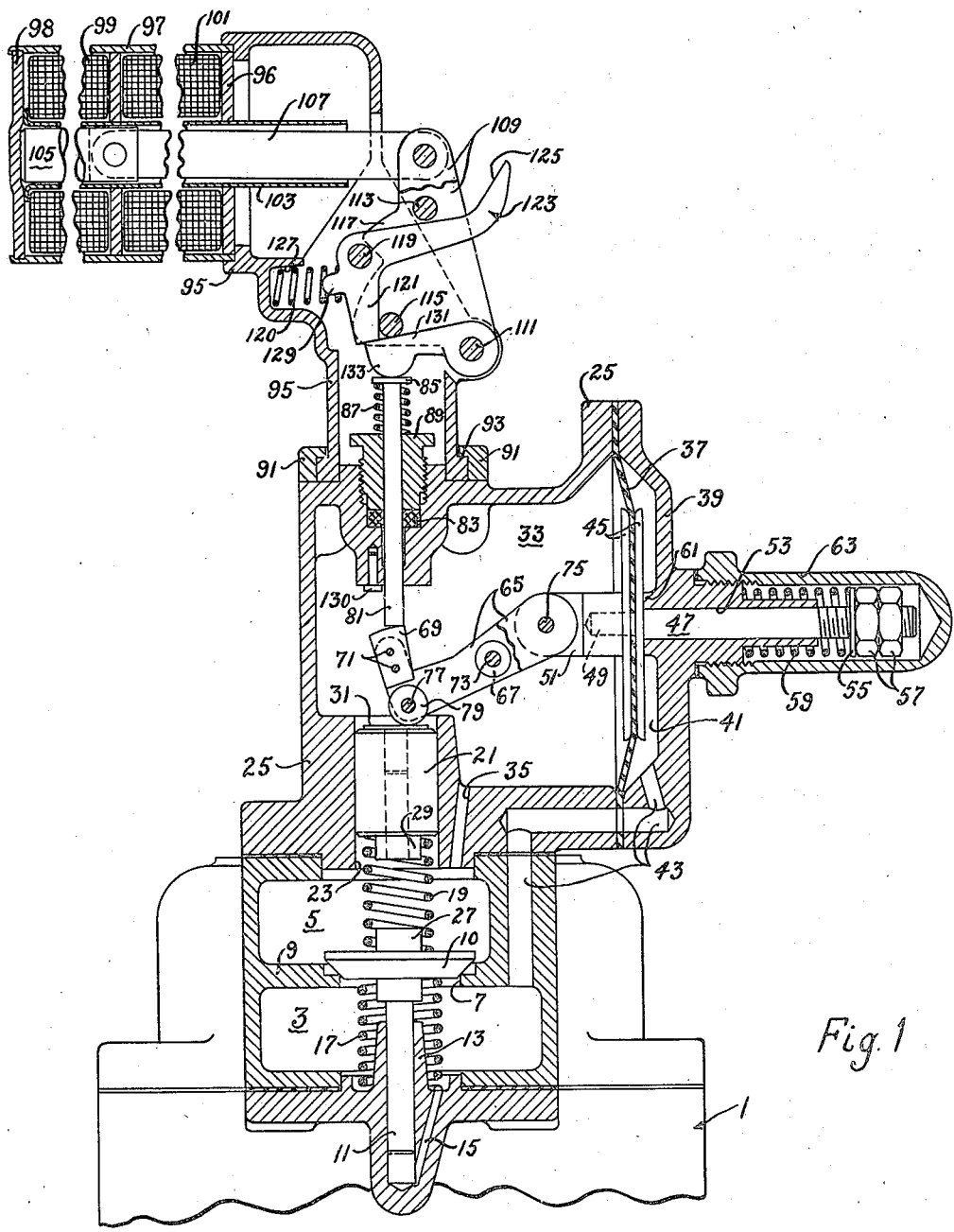
Figure 1 is a sectional view showing the parts in the valve closed position.

Referring now to Figure 1, the numeral 1 represents a fluid meter of any suitable type but preferably constructed in accordance with Patent No. 1,977,424, dated October 16, 1934.

The numeral 3 represents the inlet passage through which fuel from the fuel pump enters the metering mechanism while 5 is the outlet from which the measured fuel enters the carburetion system of the engine.

A by-pass port 7 is provided in the wall 9 which separates these two passages 3 and 5 and a valve 9 is provided for closing the port. When the port is open, the pressure drop across the port being less than that through the meter, the fuel will by-pass the meter and go directly from the inlet passage to the outlet passage.

Valve 10 is provided with a stem 11 which enters a guide 13 and a bleeder tube 15 connects the guide with the inlet passage 3 so that the valve may open and close freely.

A valve spring 17 surrounds the guide 13 and acts on the under side of the valve, tending to open it, while a second valve spring 19 acts upon the upper side of the valve. The upper end of spring 19 abuts a piston 21 which slides in a bore 23 in the body member 25. The piston serves to compress or relieve spring 19. Spring guides 27 and 29 are formed on the valve and piston respectively to hold spring 19 in place. The upper surface of the piston is formed by the head of a hardened pin 31.

The body 25 forms a chamber 33 which is connected with channel 5 by means of a passage 35. One side of the chamber 33 is formed by a diaphragm 37 which is held in place by a cap 39. Between the diaphragm and the cap is formed a chamber 41 which is connected by passage 43 with the inlet passage 3. Thus chamber 41 is the high pressure chamber and chamber 33 is the low pressure chamber.

Shields 45 are supported on opposite sides of the diaphragm and a rod 47 has a reduced end 49 which passes through the shields and the diaphragm and supports a bearing 51 in the low pressure chamber 33. The other end of the rod passes through a guide bore 53 in the cap and supports a spring seat 55 and adjusting nuts 57 at its outer end. A spring 59 is confined between the cap and the seat 55 and tends to hold the diaphragm against the stop 61 on the cap 39.

A hollow nut 63 encloses the outer end of the rod and its associated parts and screws down upon the cap 39 to prevent the loss of liquid from the chamber 41.

A pair of levers 65 of identical shape are held in spaced parallel relation by a spacer 67, a thrust block 69 and riveted pins 71 and 73. A shaft 75 passes through the bearing 51 while a second shaft 77 supports the roll 79.

A pushrod 81 is mounted in axial alignment with both the valve 10 and the piston 21. It passes through a stuffing box 83 and is provided with a head 85. A spring 87 is confined between the packing gland 89 and head 85.

Mounted on the top of body member 25 are two semi-circular cleats 91 which engage a ring 93 on the solenoid support member 95 and which are held in place by screws (not shown) which enter the support member.

A cylindrical container 97 is supported on member 95 by means of suitable brackets (not shown). Two heads 96 and 98 are fixed in the container and serve to support a tube 103 of brass or other non-magnetic material. Two solenoid coils 99 and 101 are mounted upon the brass tube. An armature 105 is slidably mounted within the tube and is connected by a link 107 to one end of a pair of levers 109 which are pivotally mounted on the member 95 at 111. The levers are held in fixed, spaced relation to each other by a pair of spacer rivets 113 and 115.

Each lever has a projection 117 which is adapted to engage a pin 119 which passes through the member 95 and is fixed therein.

Another lever which comprises a latching dog 121 and an operating arm 123 is pivotally mounted on the pin 119 and is disposed between levers 109. The arm 123 has an upwardly directed surface 125 which is adapted to be cammed in a clockwise direction by the pin 113 while the dog 121 is adapted to be stopped in counter-clockwise rotation by contact with the pin 115.

A compression spring 120, received in a recess 127 in member 95, bears against the dog 121 below pin 119 and thus urges the dog and lever 123 in a counter-clockwise direction about the pin 119. A projection 129 on the dog serves to support the end of the spring.

A rocker arm 131 is pivoted at 111 and is provided with a projection 133 which is adapted to engage the head 85 of the push rod. The upper edge of this arm is disposed so as to be actuated in a counter-clockwise direction by the pin 115. A rest 130 is provided for the thrust block 69 when it is in the Figure 2 position.

*Wiring diagram*

Referring now to Figure 3, one end of each of the coils 99—101 is grounded while the other lead 135 of coil 99 is carried to one pole 137 of a momentary contact switch. The lead 139 of coil 101 is carried to the other pole 141 of the same switch. The operating lever 143 of the switch is connected to one pole of the battery 145 by means of lead 146 while the other pole is grounded.

Centering springs 147 serve to hold the lever 143 away from either pole 137 or 141.

*Operation*

If it is assumed that the meter 1 is operating under normal pressure conditions with the by-pass valve closed, the parts will assume the positions shown in Figure 1.

Specifically, the meter outlet pressure plus the tension of spring 59 will hold the diaphragm 37 in its extreme right-hand position and consequently the thrust block 69 and roll 79, which together with their supporting means comprise an "interponent," will be directly above the piston 21 and the pushrod 81, and since the pushrod is in its lowermost position the piston will have compressed spring 19 sufficiently to overcome spring 17 and the valve 10 will accordingly be closed.

If we assume that the pressure in the inlet channel 3 increases due to increased resistance of the meter to the flow through it, this pressure increase is transmitted through channel 43 to the chamber 41 and if the pressure is sufficient to overcome the combined pressure in chamber 33 (which is equal to that in the outlet passage 5 due to the connection through passage 35) and the pressure of spring 59, then the diaphragm will shift to the left (Figure 1) and will force the thrust block 69 out of contact with the pushrod 81 and relieve the pressure on piston 21 and spring 19. When this occurs, spring 17 will lift the valve 10 and open the by-pass port 7.

As the piston rises the lever 65 rotates about pivot 75 until the thrust block 69 rests against the stop 130.

In many cases, the high pressure differential is momentary, and in such cases the diaphragm would tend to return to the Figure 1 or extreme right-hand position as soon as the high differential disappeared.

This cannot be automatically accomplished because the pushrod interferes. The switch lever 143 must therefore be moved to the "open" position which is in contact with pole 143. In such case the solenoid 101 will be momentarily energized from ground through battery 145, lever 143, contact 141, coil 101 to ground, and the armature 105 will be drawn to the right rocking the levers 109 in a clockwise direction about the pivot 111 and moving pin 115 away from rocker arm 131.

The pin 113 is carried into engagement with the cam surface 125 and rocks lever 123 and dog 121 in a clockwise direction about pivot 119, against the action of spring 120. As soon as the dog 121 passes beyond the rocker arm 131, the pushrod will be moved upwardly by spring 87 a distance which is limited by contact of the rocker arm 131 with pin 115. The lower end of the pushrod will be above the lower surface of the stop 130 so that the diaphragm, when it is urged toward the right (Figure 2), can readily pull the thrust block 69 back into alignment with the pushrod, piston and valve.

The position of the solenoid operated parts just described is shown in Figure 2. The diaphragm operated mechanism is shown, in this figure, in the position occupied when a high differential pressure is still exerted on the diaphragm.

When these diaphragm operated parts return to the position of figure one, then the operator can close the by-pass valve by turning the switch lever 143 to the "close" position. A circuit is set up from ground through battery 145, line 146, lever 143, pole 137, line 135 and coil 99 to ground. The solenoid 99 being thus momentarily energized will draw the armature 105 to the extreme left position and rotate the levers 109 in the extreme counter-clockwise position.

The pin 113 releases the cam 125 so that spring 120 may become effective to rotate the dog 121 in a counter-clockwise direction. At the same time the pin 115 depresses rocker arm 131, pushrod 81, interponent 69—79, and piston 21 to compress spring 19. The latter overcomes spring 17 and the valve 10 closes port 7.

As soon as the end of the rocker arm 131 clears the end of dog 121, the latter is pushed above the arm and locks the valve actuating parts in their lowermost positions to hold the valve closed.

This condition obtains even after the switch lever 143 is released and until either this lever is moved to the "open" position or the interponent is forced out from under the pushrod by an excessive pressure differential.

It will thus be seen that a full manual, remote control of the by-pass valve is afforded the pilot of the ship and at the same time an automatic release is afforded to prevent stalling the engine when dangerous conditions may occur. Moreover, if the dangerous condition disappears, the pilot can reclose the valve so as to restore to operation the instruments such as the gallons consumed totalizer and the rate of flow indicator which are usually operated by the meter.

It is obvious that various changes may be made in the form, structure and arrangement of parts, without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a valve mechanism the combination of a valve port, a valve mounted for movement to open and close said port for controlling the flow of liquid therethrough, power means, means connecting said valve to be opened or closed by said power means, comprising an interponent which is mounted for movement to and from connecting position, and liquid pressure operated means for moving said interponent to and from connecting position, said interponent being constructed and arranged to permit opening of said valve when it is moved from connecting position while said power means is in the valve closing position.

2. In a valve mechanism the combination of a valve port, a valve mounted for movement to open and close said port, power means, means connecting said valve to be opened or closed by said power means, comprising a movable interponent, means for moving said interponent in one direction to permit opening of said valve while said power means is in the valve closing position, comprising differential pressure operated means, connected to opposite sides of said port, and constructed and arranged for moving said interponent in said direction when the differential pressure exceeds a predetermined amount.

3. In a valve mechanism, the combination of two liquid passageways connected by a port, a valve adapted to open or close the port, power means movable between two positions, a rocker arm mounted for movement between valve closing and valve opening positions and connected to control said valve, means operated by movement of said power means to one position for moving said rocker arm to valve closing position, a latch for holding said rocker arm in valve closing position, means for yieldably urging said latch toward said rocker arm, means operable by said power means in the other position for disabling said latch, means for transmitting movement of said rocker arm to hold said valve closed comprising a movable interponent, and means for moving said interponent to release said valve for opening.

4. In a valve mechanism, the combination of two liquid passageways connected by a port, a valve adapted to open or close the port, power means movable between two positions, a rocker arm mounted for movement between valve closing and valve opening positions and connected to control said valve, means operated by movement of said power means to one position for moving said rocker arm to valve closing position, a latch for holding said rocker arm in valve closing position, means for yieldably urging said latch toward said rocker arm, means operable by said power means in the other position for disabling said latch, means for transmitting movement of said rocker arm to hold said valve closed comprising a movable interponent, and differential pressure responsive means connected to said passageways for moving said interponent to release said valve for opening.

5. In a valve operating mechanism the combination of a rocker arm, an actuator lever, a two-stroke power means connected with said actuator lever, means on said actuator lever adapted upon one stroke of said power means to engage and move said rocker arm in one direction, a latch adapted to engage and hold said rocker arm in moved position, additional means on said actuator lever adapted to release said latch upon the other stroke of said power means and means for transmitting movement from said rocker arm to said valve.

6. In a valve operating mechanism the combination of a rocker arm, an actuator lever, a two-stroke power means connected with said actuator lever, means on said actuator lever adapted upon one stroke of said power means to engage and move said rocker arm in one direction, a latch adapted to engage and hold said rocker arm in moved position, additional means on said actuator lever adapted to release said latch upon the other stroke of said power means, a push rod positioned to be operated by said rocker arm, an interponent mounted for motion with and transversely of said push rod, a plunger disposed to receive movement from said interponent, a valve, and yieldable means between said valve and plunger for transmitting movement to said valve.

7. In a valve operating mechanism the combination of a rocker arm, an actuator lever, a two-stroke power means connected with said actuator lever, means on said actuator lever adapted upon one stroke of said power means to engage and move said rocker arm in one direction, a latch adapted to engage and hold said rocker arm in moved position, additional means on said actuator lever adapted to release said latch upon the other stroke of said power means, a push rod positioned to be operated by said rocker arm, an interponent mounted for motion with and transversely of said push rod, a plunger disposed to receive movement from said interponent, a valve, yieldable means between said valve and plunger for transmitting movement to said valve, and means responsive to a predetermined differential in the pressures on opposite sides of the valve for moving said interponent transversely to release said valve.

8. In a valve operating mechanism the combination of a rocker arm, an actuator lever, a two-stroke power means connected with said actuator lever, means on said actuator lever adapted upon one stroke of said power means to engage and move said rocker arm in one direction, a latch adapted to engage and hold said rocker arm in moved position, additional means on said actuator lever adapted to release said latch upon the other stroke of said power means, a push rod positioned to be operated by said rocker arm, an interponent mounted for motion with and transversely of said push rod, a plunger disposed to receive movement from said interponent, a valve, yieldable means between said valve and plunger for transmitting movement to said valve, means responsive to a predetermined differential in the pressures on opposite sides of the valve for moving said interponent transversely to release said valve, and yieldable means for opening said valve, said latter means being more readily yieldable than said first mentioned yieldable means.

9. In a valve mechanism, the combination of a port, poppet type valve means mounted for axial movement to open or close said port, power means movable between valve opening and valve closing positions, said power means including an element movable coaxially with said valve and having a retracted position, a pressure responsive means, an interponent normally disposed between, and in contact with said element and said valve and pivotally connected with said pressure responsive means so that it may move with said element, said interponent being movable by said pressure responsive means in a direction transversely of the direction of motion of said element to a position out of contact with said element, and a stop for holding said interponent below the level of said element when it occupies the retracted position and when the interponent is out of contact with said element.

10. In a valve mechanism, the combination of a port, poppet type valve means mounted for axial movement to open or close said port, power means movable between valve opening and valve closing positions, said power means including an element movable coaxially with said valve, a pressure responsive means, an interponent normally disposed between and in contact with said element and said valve, said interponent being movable by said pressure responsive means in a direction transversely of the direction of motion of said element to a position out of contact with said element, and means for reducing the frictional resistance to said transverse motion.

11. In a valve mechanism, the combination of two liquid passages connected by a port, a valve mounted for movement in two directions to positions to open or close said port, power means movable between valve opening and valve closing positions, pressure responsive means connected to opposite sides of said port and movable between active and inactive positions for connecting said power means to close said valve or to prevent closing of the valve, said pressure responsive means being constructed and arranged to move to inactive position when the difference in pressures on opposite sides of said port reaches a predetermined maximum, and an interponent pivotally mounted on said pressure responsive means for movement in the same directions as said valve and adapted to be moved by said pressure responsive means in a direction transversely of the valve.

HOSMER L. BLUM.